United States Patent
Yi et al.

(10) Patent No.: US 9,743,317 B2
(45) Date of Patent: *Aug. 22, 2017

(54) METHOD FOR SELECTING A MASTER CM IN A COEXISTENCE NETWORK

(71) Applicant: LG Electronics Inc., Seoul (KR)

(72) Inventors: Yunjung Yi, Gyeonggi-do (KR);
Suhwook Kim, Gyeonggi-do (KR);
Eunsun Kim, Gyeonggi-do (KR);
Jihyun Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/355,736

(22) PCT Filed: Oct. 26, 2012

(86) PCT No.: PCT/KR2012/008868
§ 371 (c)(1),
(2) Date: May 1, 2014

(87) PCT Pub. No.: WO2013/066005
PCT Pub. Date: May 10, 2013

(65) Prior Publication Data
US 2015/0043338 A1    Feb. 12, 2015

Related U.S. Application Data

(60) Provisional application No. 61/555,494, filed on Nov. 4, 2011.

(51) Int. Cl.
*H04W 4/00* (2009.01)
*H04W 28/08* (2009.01)
(Continued)

(52) U.S. Cl.
CPC ....... *H04W 28/085* (2013.01); *H04L 41/0816* (2013.01); *H04L 41/30* (2013.01);
(Continued)

(58) Field of Classification Search
CPC . H04W 16/14; H04W 84/12; H04W 72/0453; H04W 72/082; H04W 72/02; H04W 24/00
(Continued)

(56) References Cited

U.S. PATENT DOCUMENTS

2008/0176519 A1* 7/2008 Kwak ................. H04L 1/20
455/67.13
2009/0059881 A1* 3/2009 Theobold ............. H04W 28/00
370/338

(Continued)

FOREIGN PATENT DOCUMENTS

| CN | 102215052 A | 10/2011 |
|---|---|---|
| WO | 2011/042590 A1 | 4/2011 |
| WO | 2011/062395 A2 | 5/2011 |

OTHER PUBLICATIONS

Tuncer Baykas et al., "Overview of TV white spaces: current regulations, standards and coexistence between secondary users", IEEE 21st International symposium on personal, Indoor and mobile radio communications workshops, Sep. 30, 2010.
(Continued)

*Primary Examiner* — Sai Aung
(74) *Attorney, Agent, or Firm* — Morgan, Lewis & Bockius LLP

(57) ABSTRACT

The present invention relates to a method for requesting the selection of a master management apparatus through a server by a management apparatus enabling television white space (TVWS) apparatuses to coexist in a TVWS. The method includes the steps of: determining whether the
(Continued)

trigger condition of the process for selecting the master management apparatus is satisfied; and requesting the selection of the master management apparatus by the server, wherein the master management apparatus is configured to determine a channel selection in the TVWS for terminals connected to the master management apparatus and a slave management apparatus, and the trigger condition can be based on the load balance parameters or geographical coverage parameters of the management apparatus.

14 Claims, 13 Drawing Sheets

(51) Int. Cl.
*H04W 16/14* (2009.01)
*H04L 12/24* (2006.01)
*H04W 28/02* (2009.01)
*H04W 16/04* (2009.01)
*H04W 16/10* (2009.01)

(52) U.S. Cl.
CPC ....... *H04W 16/14* (2013.01); *H04W 28/0236* (2013.01); *H04W 16/04* (2013.01); *H04W 16/10* (2013.01)

(58) Field of Classification Search
USPC ......... 370/328, 329, 338; 455/509, 454, 501
See application file for complete search history.

(56) References Cited

U.S. PATENT DOCUMENTS

| | | | |
|---|---|---|---|
| 2010/0220687 A1* | 9/2010 | Reznik | H04W 36/005 370/331 |
| 2011/0116458 A1 | 5/2011 | Hsu et al. | |
| 2011/0250842 A1 | 10/2011 | Stafford et al. | |
| 2011/0280180 A1* | 11/2011 | McCann | H04L 63/08 370/328 |
| 2012/0106364 A1* | 5/2012 | Kasslin | H04W 16/14 370/252 |
| 2012/0108179 A1* | 5/2012 | Kasslin | H04W 16/14 455/67.13 |
| 2012/0185429 A1 | 7/2012 | Shu et al. | |
| 2012/0195269 A1* | 8/2012 | Kang | H04W 72/082 370/329 |

OTHER PUBLICATIONS

Jari Junell et al., "Coexistence for unlicensed spectrum users in white spaces", 2010 3rd international symposium on ISABEL, Nov. 10, 2010.
International Search Report issued in corresponding International Patent Application No. PCT/KR2012/008868 dated Feb. 22, 2013.
Office Action issued in corresponding Chinese Patent Application No. 201280065488.5 dated Mar. 20, 2017.

* cited by examiner (a)  (b)

FIG. 4
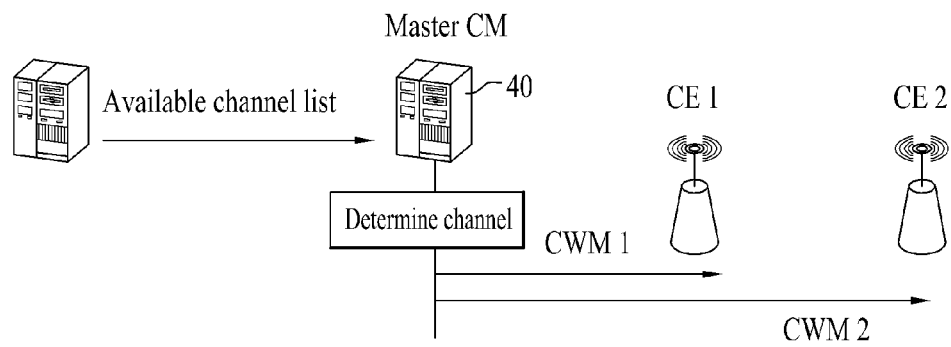
(a)
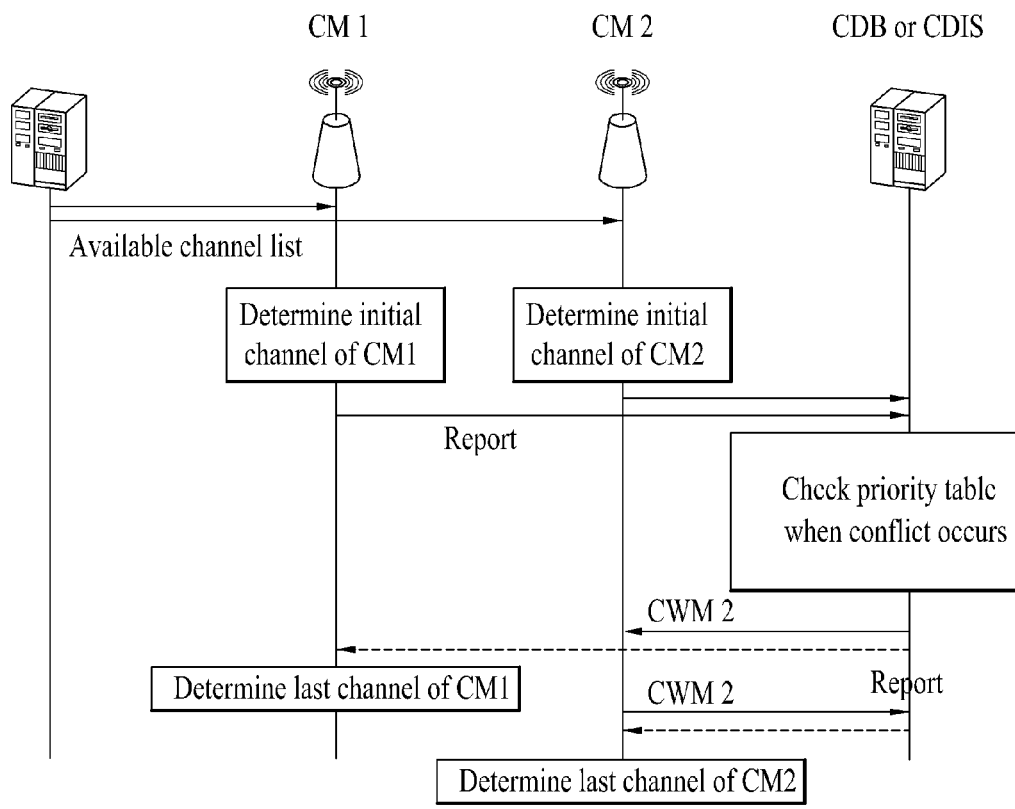
(b)

▲ TVBD device or network

METHOD FOR SELECTING A MASTER CM IN A COEXISTENCE NETWORK

TECHNICAL FIELD

The present invention relates to a reconfiguration mechanism of a coexistence topology using centralized and distributed coexistence topologies, and more particularly, to a method and apparatus for selecting a master device for the reconfiguration.

BACKGROUND ART

Recently, as explosive growth in radio data traffic has expected due to activation of an echo system related to wireless Internet such as a smart phone, App store, etc., interest in frequency sharing as a method for expanding frequency supply has increased correspondingly. However, problems can arise in that it can be difficult to rapidly respond to such increase and frequency supply can be limited under a current frequency management system. That is, a process of recovering or rearranging existing frequencies and distributing the frequencies to new service providers via auction or the like can be ineffective in terms of time and it becomes more difficult to ensure new frequencies on a frequency distribution table basically.

A frequency sharing method has been in the spotlight as a scheme capable of solving the above problems. Advocates for frequency sharing consider that a current shortage of frequencies is caused by a conventional partition type frequency management method and can be solved via a sharing method although a frequency looks deficient on the frequency distribution table. However, frequency sharing is not a new concept but a method for resource management of a communication system in terms of technology, and various frequency sharing methods have been applied. Examples of the frequency sharing method may also include a cellular method, time division multiple access (TDMA), code division multiple access (CDMA), etc. that are conventionally and widely used.

According to an existing sharing method, interference can be effectively suppressed under the same technological standard or control of service providers. However, a distributional sharing method that has been recently introduced, for example, cognitive radio (CR) likely to cause tragedy of commons and harmful interference due to indiscriminate use of frequencies. Accordingly, the method can cause problems in terms of frequency management and protection of existing users and contradict with the intent of a market-based frequency policy as the current tendency of a frequency management system.

However, advocates for frequency sharing consider that the problems in terms of protection of existing users from interference and the problems due to indiscriminate use of frequencies can be overcome or controlled by political and technological means such as technological regulation, standard establishment, etc.

A type of frequency sharing method can be classified according to a sharing 'method' and 'subject and object'. Here, in detail, coexistence and cooperative methods are considered as the sharing method. In addition, the sharing subject and object can be classified into sharing among equals in which a subject and an object have equivalent positions and primary-secondary sharing in which a primary user and a secondary user share a frequency.

First, in the cooperative method, a separate protocol is present, and thus, resource allocation and interference avoidance are possible via organic cooperation among all users. Resource allocation and interference avoidance can be centrally performed via a base station (BS), etc. or may be distributively performed between users. Examples of the former may include a mobile communication system such as CDMA/TDMA methods and examples of the latter may include an ad-hoc system.

On the other hand, a case in which users separately perform interference avoidance without resource allocation using this common protocol can be referred to as mutual coexistence. Examples of the mutual coexistence (or simply coexistence) scheme may include a wireless local area network (LAN), a cordless phone, etc. as currently commercialized technologies and may also include overlay and underlay technologies. Compared with the cooperative scheme, according to the coexistence scheme, resource allocation and interference control are passively intervened in terms of technologies, and thus, problems arise in that the probability of interference increases.

In addition, a coexistence topology may be a centralized coexistence topology and a distributed coexistence topology. The centralized coexistence topology has global information for decision making and thus effectively manages interference. However, according to the centralized coexistence topology, performance is degraded due to excessive computational overhead in proportion to the number of devices to be managed. On the other hand, the distributed coexistence topology requires low computational and communication overhead. However, compared with centralization approach, according to the distributed coexistence topology, local optimization is used, and thus, high interference can be caused.

DISCLOSURE

Technical Problem

An object of the present invention devised to solve the problem lies in a condition for selection of a master coexistence manager (CM) for reconfiguration of a coexistence topology in associated with reconfiguration of the aforementioned coexistence topology for balancing interference and overhead.

It is to be understood that both the foregoing general description and the following detailed description of the present invention are exemplary and explanatory and are intended to provide further explanation of the invention as claimed.

Technical Solution

The object of the present invention can be achieved by providing a method for requesting a server to select a master management apparatus by a management apparatus for coexistence of television white space (TVWS) devices in a television white space (TVWS), the method including determining whether a trigger condition of a process for selection of the master management apparatus is satisfied, and requesting the server to select the master management apparatus when the trigger condition is satisfied, wherein the master management apparatus is configured to perform determination associated with channel selection in the TVWS for the TVWS devices connected to a slave management apparatus and the master management apparatus, and the trigger condition is based on a load balancing parameter or geographic coverage parameter of the management apparatus.

Alternatively or additionally, the determining may include comparing the load balancing parameter and a reference value.

Alternatively or additionally, the determining may include determining whether geographic coverage of the management apparatus based on the geographic coverage parameter is contained in geographic coverage of another management apparatus based on a geographic coverage parameter of the another management apparatus.

Alternatively or additionally, the load balancing parameter may be dependent upon the number of networks or TVWS devices connected to the management apparatus.

Alternatively or additionally, the load balancing parameter may be dependent upon the number of channels available for the management apparatus.

Alternatively or additionally, the trigger condition may be further based on an interference parameter of the management apparatus, and the interference parameter may include at least one of a first interference parameter and a second interference parameter.

Alternatively or additionally, the first interference parameter may be an average noise power indicator (ANPI), and the ANPI may indicate the sum of an interference power value and an average noise power value measured for a predetermined period of time with respect to a channel used by the management apparatus.

Alternatively or additionally, the second interference parameter may be a ratio of the number of networks or TVWS devices registered to a management apparatus to the number of TVWS devices or networks registered to the management apparatus.

In another aspect of the present invention, provided herein is a management apparatus for coexistence of television white space (TVWS) devices in a television white space (TVWS), the management apparatus including a controller configured to perform determination associated with the coexistence, wherein the controller is configured to determine whether a trigger condition of a process for selection of a master management apparatus is satisfied and to request a server to select the master management apparatus when the trigger condition is satisfied, the master management apparatus is configured to perform determination associated with channel selection in the TVWS for the TVWS devices connected to a slave management apparatus and the master management apparatus, and the process is triggered based on a geographic coverage parameter or load balancing parameter of the management apparatus.

Alternatively or additionally, the controller may be configured to compare the load balancing parameter and a reference value in order to determine whether the trigger condition is satisfied.

Alternatively or additionally, the controller may be configured to determine whether geographic coverage of the management apparatus based on the geographic coverage parameter is included in or overlaps geographic coverage of another management apparatus based on a geographic coverage parameter of the another management apparatus in order to determine whether the trigger condition is satisfied.

Alternatively or additionally, the load balancing parameter may be dependent upon the number of networks or TVWS devices connected to the management apparatus.

It is to be understood that both the foregoing general description and the following detailed description of the present invention are exemplary and explanatory and are intended to provide further explanation of the invention as claimed.

Advantageous Effects

According to embodiments of the present invention, master coexistence manager (CM) selection trigger for reconfiguration of a coexistence topology can be effectively performed, and thus, loads of a plurality of CMs can be additionally balanced and managed, thereby reducing communication overhead between CMs.

DESCRIPTION OF DRAWINGS

The accompanying drawings, which are included to provide a further understanding of the invention, illustrate embodiments of the invention and together with the description serve to explain the principle of the invention.

In the drawings:

FIG. 4 is a diagram illustrating concept of comparison between operations of coexistence systems with a centralized topology and a distributed topology according to an embodiment of the present invention;

BEST MODE

Figure 1:
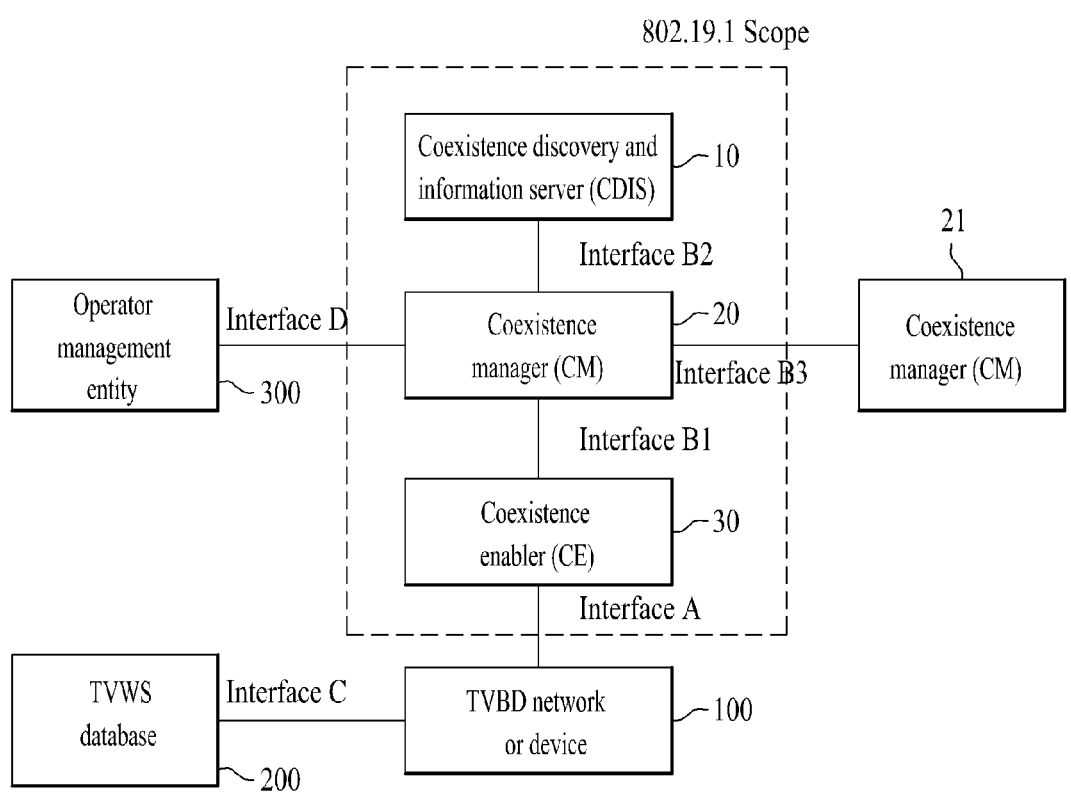
FIG. 1 is a block diagram illustrating a coexistence system according to an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present invention. As used herein, the term "and/or" includes any and all combinations of one or more of the associated listed items.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present.

The terms used in the present specification are used for explaining a specific exemplary embodiment, not limiting the present inventive concept. Thus, the expression of singularity in the present specification includes the expression of plurality unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Unless otherwise defined, all terms including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail by explaining exemplary embodiments of the invention with reference to the attached drawings. The same reference numerals in the drawings denote like elements, and a repeated explanation thereof will not be given.

In the description of the present invention, certain detailed explanations of related art are omitted when it is deemed that they may unnecessarily obscure the essence of the invention. The features of the present invention will be more clearly understood from the accompanying drawings and should not be limited by the accompanying drawings. It is to be appreciated that the spirit and technical scope of the present invention can encompass all changes, equivalents, and substitutes in addition to the attached drawings.

FIG. 1 is a block diagram illustrating a coexistence system according to an embodiment of the present invention.

In this specification, coexistence refers to the capability of two or more frequency (spectrum)-dependent devices or networks to operate without harmful interference. In addition, a coexistence service refers to a service provided to dissimilar or independently operated white space objects (WSOs) by a coexistence system and a service provided to other entities of the coexistence system by entities of the coexistence system. The WSO is an entity indicating a television white space (TVWS) devices, a television band device (TVBD), a network of TVWS devices, or a TVBD network and is connected to a coexistence enabler for consumption of coexistence services.

In this specification, the TVWS device and the TVBD or TVBD device are interchangeable, the TVWS network and the TVBD network are also interchangeable termed, and these terms may correspond to an entity referred to as a WSO.

As illustrated in FIG. 1, a structure of a coexistence system, that is, an 802.19 system includes three logical entities and six logic interfaces. Here, the logical entities may be installed or mounted on respective physical devices. Thus, the logical entities may be embodied as hardware using the devices on which the logical entities are installed or mounted. In order to clarify claims of the present invention, the logical entity may be termed an apparatus or device in this specification including the claims. For example, a coexistence manager (CM) 20 may be termed a "management apparatus" and a coexistence discovery and information server (CDIS) 10 may be simply termed a "server".

The three logical entities are each defined as the CM 20, a coexistence enabler (CE) 30, and a coexistence database (CD) or coexistence discovery and information server (CDIS) 10 according to function. The six logic interfaces are each defined as an interface A, an interface B1, an interface B2, an interface B3, an interface C, and an interface D according to whether the logic interface interfaces with another logical entity of 802.19.1.

Additionally, the 802.19 system is connected to external elements such as a TVWS database 200, a TVBD network or device 100, or an operator management entity (OME) 300.

Here, TV white space refers to a vacant frequency band that is not used by a broadcaster in VHF and UHF frequency bands that are distributed for TV broadcast and refers to an unlicensed band that can be used by any user when he or she satisfies conditions of radio wave regulations of the government. In detail, the TV white space refers to a vacant band for prevention of frequency interference between broadcasters and a frequency band that is not used for each region or an area to which radio waves for broadcast do not reach for each region from a spatial point of view, and refers to a vacant broadcast frequency in a time zone when a broadcaster does not broadcast at dawn from a temporal point of view.

A TV whitespace includes VHF bands 54 to 60, 76 to 88, and 174 to 216 MHz and UHF bands 470 to 698 MHz that are allocated to a broadcast TV system. In 512 to 608 MHz and 614 to 698 MHz, operations are allowed for all unlicensed devices except for in some particular cases, but bands 54 to 60 MHz, 76 to 88 MHz, 174 to 216 MHz, and 470 to 512 MHz, only communication between fixed devices is allowed. A fixed device is a device that performs transmission from a fixed location.

A TV white space device should not interfere with a TV viewer as a customer of a broadcaster, should not interrupt reception, and should not affect a wireless microphone device that communicates with low power using a portion of the band. In order satisfy this condition, the TV white space device requires the following technologies.

The TV white space device may require technologies such as a spectrum sensing technology for recognizing a TV channel being used to protect a broadcast channel, a access protocol technology for database having position-based TV channel information, a coexistence technology between heterogeneous devices using a TVWS band, an intelligent and autonomous wireless access element technology for a variable radio channel, a security technology for subscriber authentication for radio channel protection and protection of DBs and users, etc. The present invention will be described in terms of a coexistence technology between homogeneous or heterogeneous apparatuses (or devices) among these technologies.

The CM 20 and the CE 30 are logical entities defined for coexistence between different wireless service providers or wireless systems that operate in an unlicensed state in a TVWS. The CM 20 is an entity for resource allocation in order to overcome an issue associated with an interface between CEs 30 connected to the CM 20 while providing a guideline and policy associated with coexistence for coexistence between different service providers and systems operating in a TVWS.

The CE 30 may request and acquire information required for coexistence to and from the TVBD network or device 100, convert structure change requests/commands and control information received from the CM 20 into TVBD-specific structure change requests/commands, and transmit the TVBD-specific structure change requests/commands to the TVBD network or device 100. The TVBD network or device 100 refers to a user equipment for allowing use of a TV white space in the federal communication commission (FCC).

In order to overcome a coexistence issue between TVBD networks, the CM 20 may have a function of searching for other CMs, a coexistence decision making function of generating and providing control information and coexistence request/command corresponding to the CE 30, and a function of supporting information exchange required for coexistence between CMs (which may include hierarchical or peer-to-peer decision making when CMs are arranged).

The CM 20 may have a function of selecting a master CM by sharing information between various CMs, a function of generating a coexistence whitespace map having a distributed topology in order to effectively share frequency resources between different networks and systems, and a function of adjusting networks during management associated with TVWS coexistence.

The CM 20 may be embedded in a device such as an access point (AP) or may be installed out of the device. A fixed device such as an access point (AP) may have a function of the CM 20 and may select and manage a master CM for mastering a set including devices that are spatially separated, a service provider, or a specific system.

In this case, the master CM may be selected by the CD or CDIS 10 for allowing spatial reuse between spatially separated users. In this case, an interface map between CMs for resource allocation may be acquired as geo-location information or acquired by further using and processing neighbor information acquired from CMs. In the case of homogeneous networks, the master CM may be selected via communication between the networks, and in the case of heterogeneous networks, the master CM may be selected via negotiation via the CD or CDIS 10.

The CM 20 may have a hierarchical CM structure according to coverage or specific classification standard. With reference to a whitespace map (WM) acquired from the CD or CDIS 10, a procedure in which an uppermost-layer CM selects a resource in consideration of a lower layer of the uppermost-layer CM and a lower-layer CM selects a resource among the remaining resources in consideration a lower layer of the lower-layer CM.

In the case of a small size network with low coverage/power, the probability that a primary user is detected is relatively low and thus more available TVWS channels are present. Accordingly, a small size network compares a whitespace map (WM) of adjacent heterogeneous networks and a whitespace map (WM) of the small size network via the CM 20 and preferentially selects and uses a channel that cannot be used by adjacent networks, which can be adjusted by the CDIS 10 but can be distributively performed in a reverse order from the small size network.

The CD or CDIS 10 may have a function of generating a coexistence whitespace map having a centralized topology in order to effectively sharing a frequency resource between different networks and systems, a function of controlling a plurality of operators during management associated with TVWS coexistence, and a function of selecting a master CM in order to reduce communication overhead between CMs and to overcome the coexistence issue.

In addition, the CD or CDIS 10 may perform a function of calculating a coexistence contour in order to search for neighboring networks/systems, a function of redirecting a resource C-MAP according to a TVBD in order to the coexistence issue, a function of boosting opening of an interface between CMs to support search of CMs, and a function of collecting, synthesizing, and providing information for boosting of coexistence.

The CD 10 may omnipotently distribute resources for resource allocation, may suggest a criteria of priority between CMs and control resource selection of each CM as an intermediary, or may function as a medium for sharing information between external and heterogeneous networks between CMs as a DB.

The interface may be classified into three groups as illustrated in FIG. 1. The interface may classified into interface B1, an interface B2, and an interface B3 as an interface between 802.19.1 entities, an interface A as an interface between an 802.19.1 entity and a TVBD network/device, and an interface C and an interface D as an interface between an 802.19.1 entity and a TVWS database or an OME. The different interfaces in each group may be classified according to a using method thereof, a type of exchanged information, and underlying protocols.

The interface A may be an interface between the CE 30 and the TVBD network or device 100 and may be used to receive information required for coexistence, configuration/information request for coexistence, configuration/measurement/information response for coexistence, and other information as necessary from the TVBD network or device 100. Reconfiguration request/command and control information (corresponding to control information and coexistence request/command received from the CM), request/command associated with control of a measurement value, performed by the TVBD network or device 100, information indicating available resources, and other information as necessary from the CE 30 to the TVBD network or device 100.

The interface B1 may be an interface between the CE 30 and the CM 20 and may be used to provide information required for coexistence (information acquired from the TVBD network or device 100) and other information as necessary to the CM 20 from the CE 30. Coexistence request/command and control information and other information as necessary may be provided to the CE 30 from the CM 20.

The interface B2 may be an interface between the CM 20 and the CD or CDIS 10 and may be used to provide information required for a coexistence map, information required for a neighbor set, information required for registration/unenrollment, information required for searching (which is acquired by a currently used CM), information required for coexistence, and information as necessary to the CD or CDIS 10 from the CM 20.

Information indicated for a coexistence map, information indicated for a neighbor set, information indicated for a master CM, information required for search (which is acquired by another CM), information required for coexistence (which is acquired by another CM), and other information as necessary are provided to the CM 20 from the CD or CDIS 10.

The interface B3 may be an interface between the CM 20 and a CM 21 and may be used to provide information and messages for searching and coexistence, information indicated for registration/unregistration (to a master CM from a CM or to a server CM from a device CM), information indicated for coexistence (to a master CM from a CM or to a device CM from a server CM), and other information to the CM 21 from the CM 20.

The interface C may be an interface between the TVBD device 100 and the TVWS database 200 and may be used to provide information indicated for an available channel to the TVBD device 100 from the TVWS DB 200.

The interface D may be an interface between the CM 20 and the OME 300 and may be used to provide network operation information associated with information of the CM 20 (e.g., limiting factors associated with management of spectrum policy/network) and other information as necessary from the OME 300.

The coexistence system described with reference to FIG. 1 may have various topologies and may be largely classified into a centralized topology, a distributed topology, an autonomous topology. The present invention will be described in terms of a coexistence system having centralized and distributed topologies.

Figure 2:
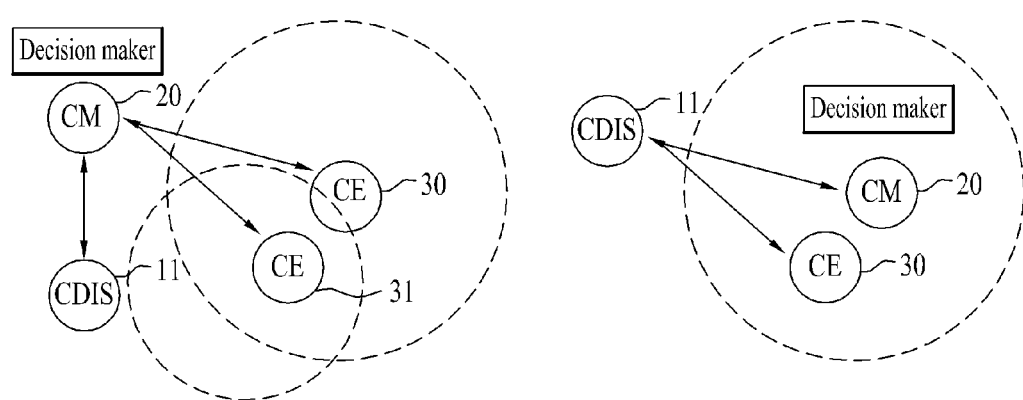
FIG. 2 is a diagram illustrating concept of a method for selecting a master coexistence manager (CM) in a coexistence system with a centralized topology according to an embodiment of the present invention.

FIG. 2 is a diagram illustrating concept of a method for selecting a master CM in a coexistence system with a centralized topology according to an embodiment of the present invention. As illustrated in FIG. 2, in the coexistence with a centralized topology, a CDIS 11 mainly stores and processes data and the CM 20 may function as a decision maker. In particular, the master CM 20 may control all networks or other UEs. In this case, one of TVBDs that interface with a network may be selected as the master CM 20.

Figure 3:
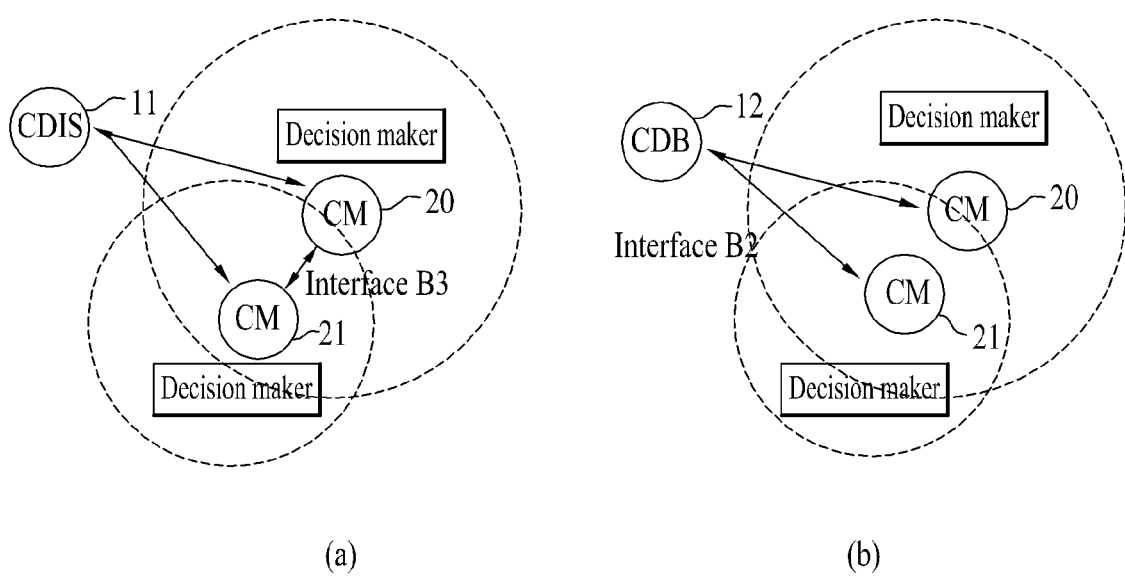
FIG. 3 is a diagram illustrating concept of a method for selecting a master CM in a coexistence system with a distributed topology according to an embodiment of the present invention.

FIG. 3 is a diagram illustrating concept of a method for selecting a master CM in a coexistence system with a distributed topology according to an embodiment of the present invention. As illustrated in FIG. 3, in the coexistence with a distributed topology, the CDIS 11 or a coexistence database (CDB) 12 may boost opening of interfaces between CMs, and the CM 20 may exchange information required for coexistence and perform hierarchical or peer-to-peer decision making.

The coexistence system of FIG. 3 may perform decision making via negotiation between CMs through an interface (the interface B3) to determine a master CM as illustrated in FIG. 3(a) or the CM 20 may request mediation to the CDIS 11 or a CDB 12 through an interface (the interface B2) to perform decision making or determine a master CM as illustrated in FIG. 3(b)

FIG. 4 is a diagram illustrating concept of comparison between operations of coexistence systems with a centralized topology and a distributed topology according to an embodiment of the present invention. As illustrated in FIG. 4(a), in the coexistence system with a centralized topology, a master (master or super) CM 40 may allocate independent channels to different CMs (or CEs), respectively. In this case, a coexistence whitespace map (CWM) may be used to indicate channels to be used.

As illustrated in FIG. 4(b), in the coexistence system with a distributed topology, CMs (e.g., a CM1 and a CM2) may be classified and given by priority according to predetermined based or standard. The CM 20 may report/send priority information about available channels to CDB/CDIS or other CMs. In this case, a CWM may be used as channels to be selected by CMs.

System requirements for decision making illustrated in FIG. 4 will now be described. An 802.19.1 system needs to analyze acquired information, to perform coexistence determination, and to support various topologies. Here, information may contain a bandwidth of each TVWS network or device, power limitation of each TVWS channel and an available channel list obtained from each TVWS network/ device, and regulations, system parameters or pre-analyzed surrounding information, irrespective of a type of topology.

Figure 5:
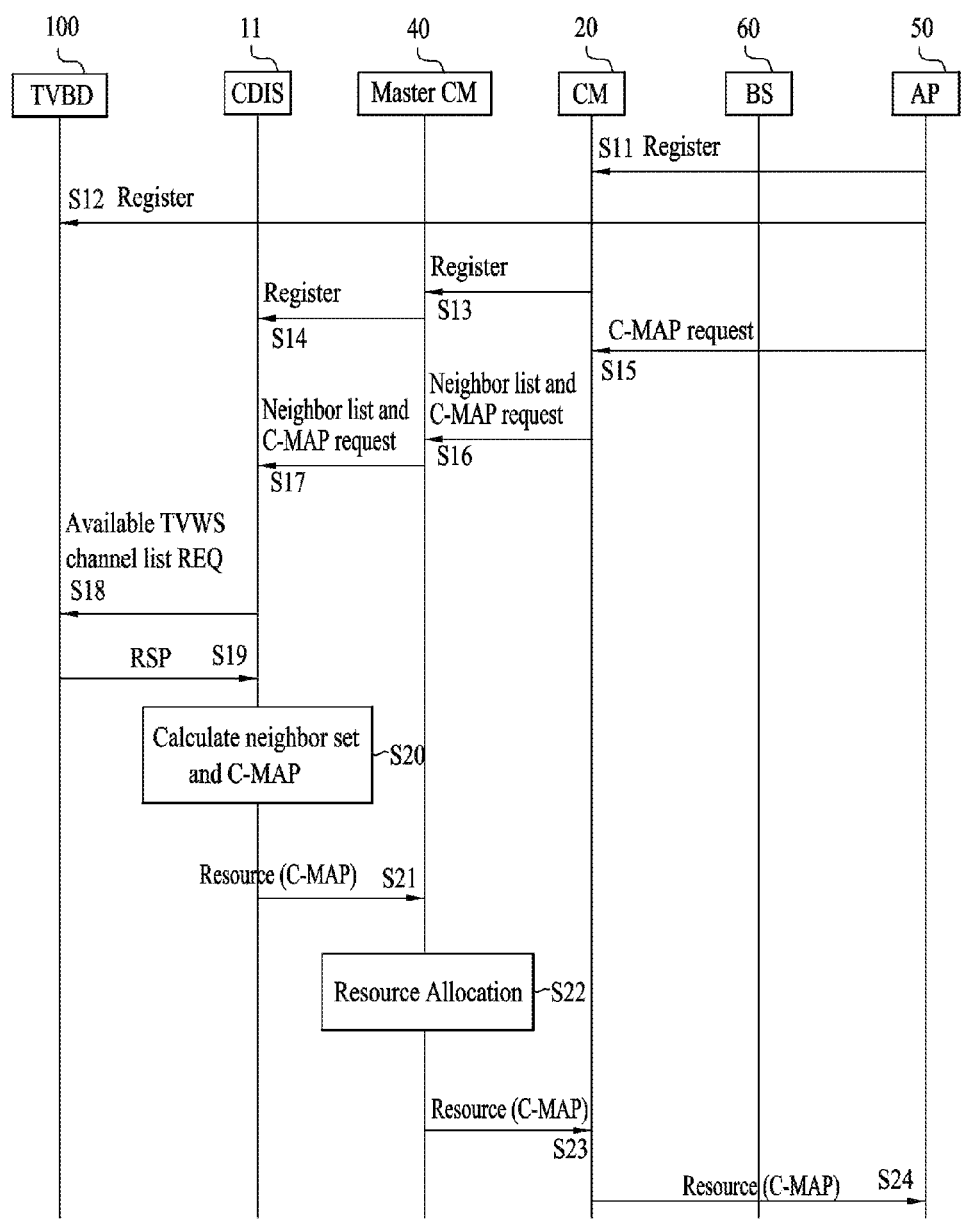
FIG. 5 is a signal flowchart illustrating a method for allocating a resource by a master CM in a coexistence system with a centralized topology according to an embodiment of the present invention.
Figure 6:
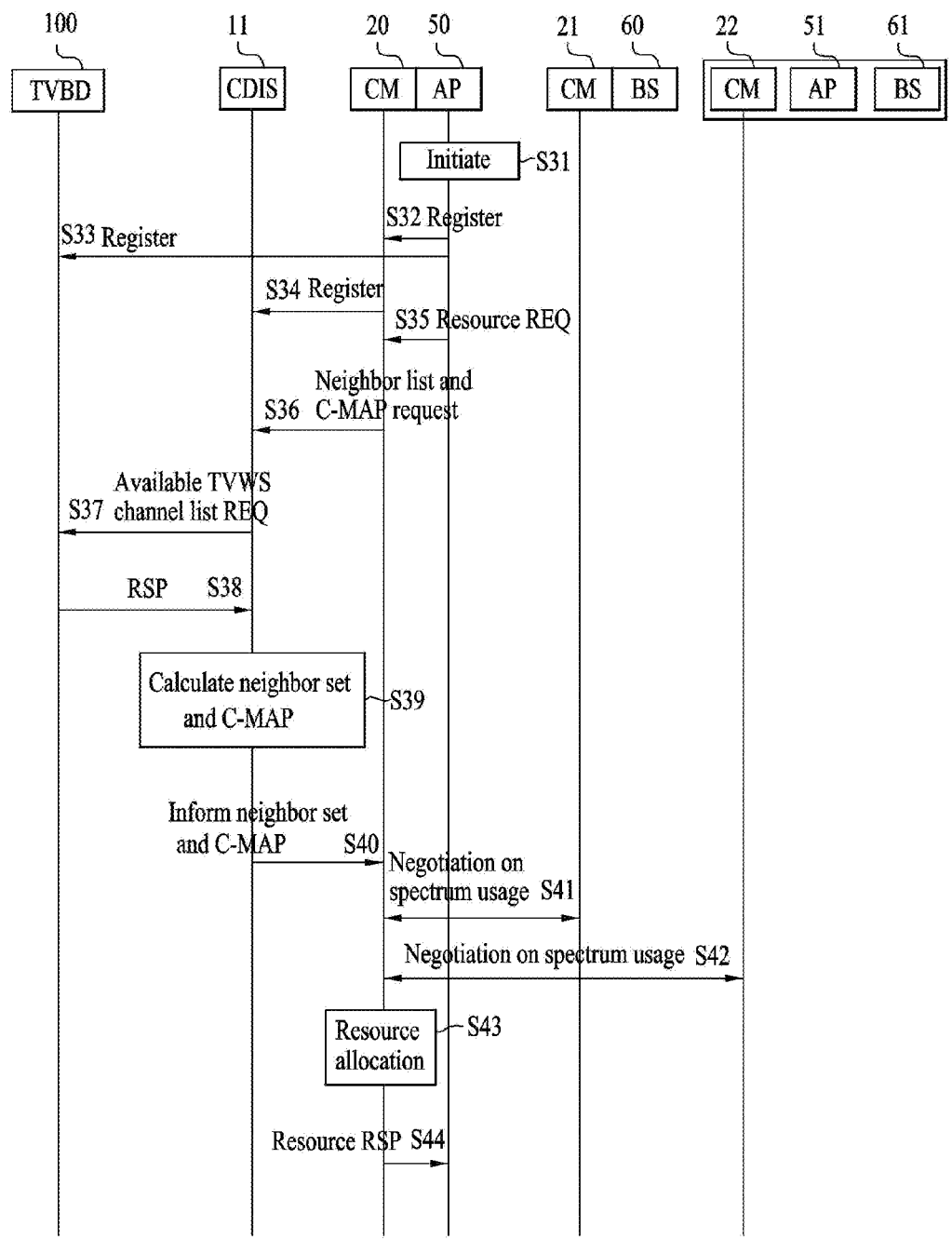
FIG. 6 is a signal flowchart illustrating a method for allocating a resource by a master CM in a coexistence system with a distributed topology according to an embodiment of the present invention.

FIGS. 5 and 6 are signal flowcharts of a method for allocating a resource by a master CM or a mater device in the coexistence systems with a centralized topology and a distributed topology described with reference to FIGS. 2 to 4.

FIG. 5 is a signal flowchart illustrating a method for allocating a resource by a master CM in a coexistence system with a centralized topology according to an embodiment of the present invention.

As illustrated in FIG. 5, the method for allocating a resource by the master CM 40 in one centralized topology may include steps S15 to S17 of requesting resources by an AP 50, steps S18 to S21 of acquiring an available channel list from the TVBD 100 by the CDIS 11 to indicate the available channel list to the master CM 40, and steps S22 to S24 of allocating a resource to the CM 20 by the master CM 40.

Hereinafter, a procedure of allocating a resource by a master CM by a centralized topology will be described in detail with reference to FIG. 5.

When an AP 50 is registered to the TVBD 100 and the CM 20 (S11 to S12), the CM 20 is registered to the master CM 40(S13), and the master CM 40 is registered to the CDIS 11 (S14). When the AP 50 requests the CM 20 for a resource via resource request (Resource (C-MAP) REQ) (S15), the CM 20 requests the master CM 40 for a neighbor list and information about C-MAP (S16), and the master CM 40 requests the CDIS 11 for the neighbor list and the information about C-MAP (S17).

The CDIS 11 requests the TVBD 100 for an available TVWS channel list REQ, (S18), receives a response to the request from the TVBD 100 (S19), and calculates a neighbor or a neighbor set of the CM 20 and C-MAP (S20). The CDIS 11 may notify the master CM 40 of C-MAP and a neighbor list of the CM20 as results obtained via the step S20 (S21). The master CM 40 allocates the resource (C-MAP) based on the notification to the CM 20 (S22 to S23), and the CM 20 notifies the AP 50 of the C-MAP (S24).

FIG. 6 is a signal flowchart illustrating a method for allocating a resource by a master CM in a coexistence system with a distributed topology according to an embodiment of the present invention.

As illustrated in FIG. 6, the method for allocating a resource by the master CM 20 in one distributed topology may include steps S35 to S37 of requesting resources by an AP 50, steps S37 to S40 of acquiring an available channel list from the TVBD 100 by the CDIS 11 to indicate the available channel list to the CM 20, and steps S41 and S42 of negotiating a resource with other CMs (e.g., the CM 21 and the CM 22) by the CM 20.

Hereinafter, a procedure of allocating a resource by the master CM 20 by a distributed topology will be described in detail with reference to FIG. 6.

When the AP 50 is registered to the TVBD 100 and the CM 20 (S31 to S33), the CM 20 is registered to the CDIS 11 (S34). When the AP 50 requests the CM 20 for a resource via resource request (Resource REQ) (S35), the CM 20 requests the CIDS 10 for neighbor list information and C-MAP (S36).

The CDIS 11 requests the TVBD 100 for an available TVWS channel list REQ (S37), receives a response to the request from the TVBD 100 (S38), and calculates a neighbor set of the CM 20 and C-MAP (S39). The CDIS 11 may notify the CM 20 of C-MAP and a neighbor list of CMs as results obtained via the step S39 (S40), and the CM 20 negotiates a resource with other CMs (e.g., the CM 21 and the CM 22) based on the notification (S41 to S42) and reallocates a resource C-MAP to the AP 50 (S43 to S44).

Figure 7:
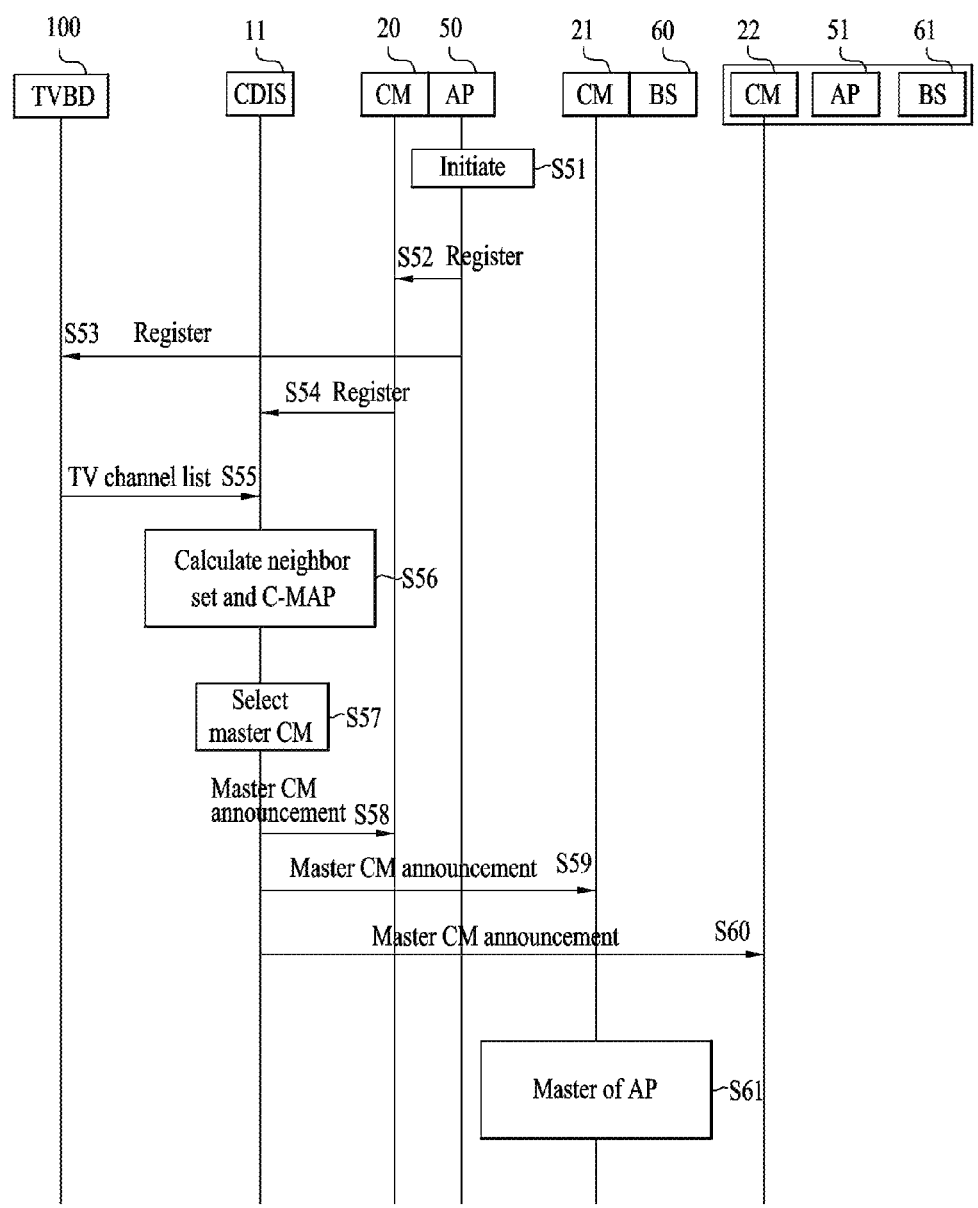
FIG. 7 is a signal flowchart illustrating a method for selecting a master CM in a coexistence system with a centralized topology according to an embodiment of the present invention.
Figure 8:
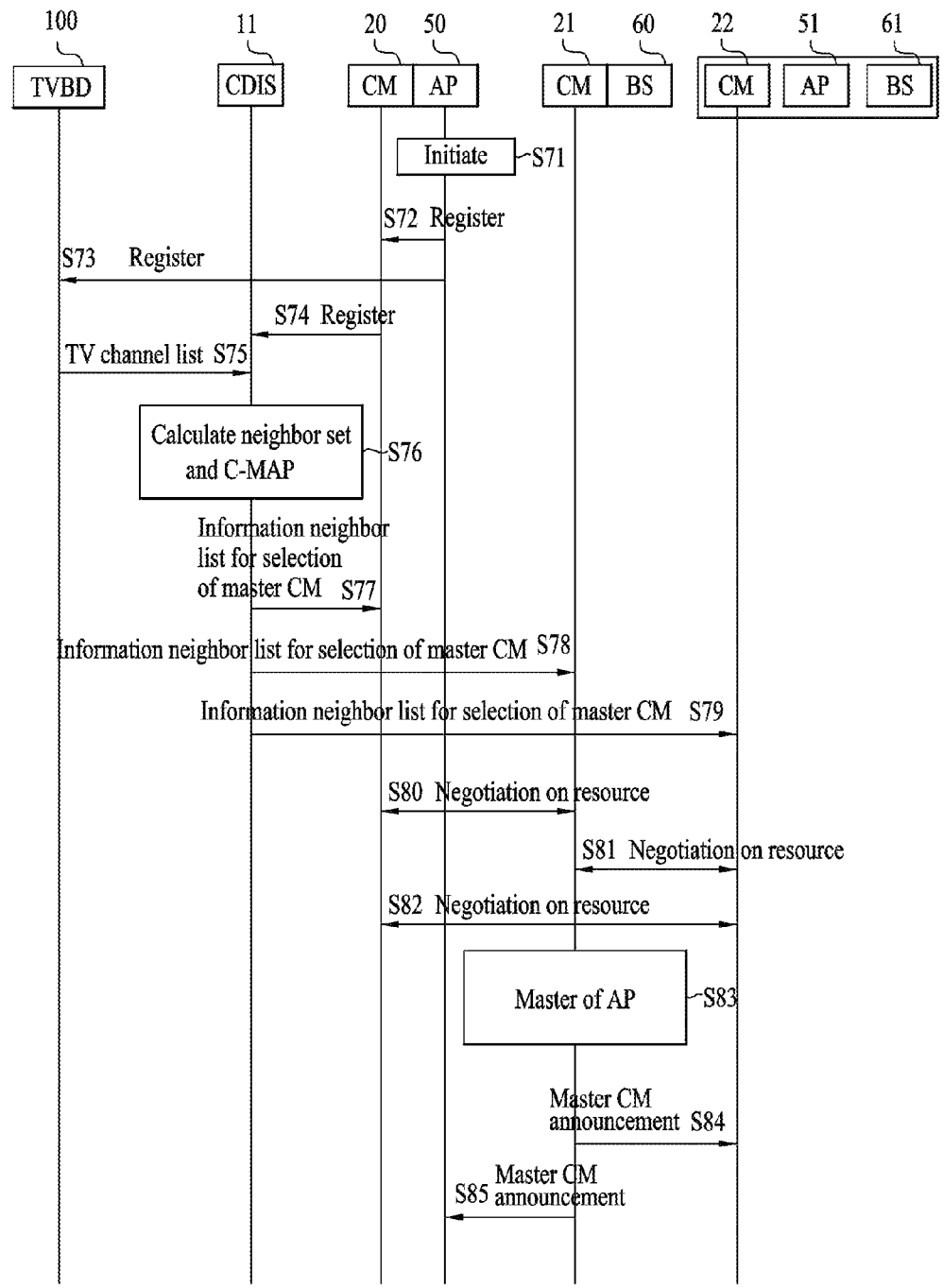
FIG. 8 is a signal flowchart illustrating a method for selecting a master CM in a coexistence system with a distributed topology according to an embodiment of the present invention.

FIGS. 7 and 8 are signal flowcharts illustrating a method for selecting a master CM (or a master device) in the coexistence systems with a centralized topology and a distributed topology described with reference to FIGS. 2 to 4.

FIG. 7 is a signal flowchart illustrating a method for selecting the master CM in a coexistence system with a centralized topology according to an embodiment of the present invention.

As illustrated in FIG. 7, the method for selecting the master CM by a centralized topology includes a step S55 of receiving TV channel lists from the TVBD 100 by the CDIS 11, steps S56 and S57 of calculating C-MAP and a neighbor of CMs by the CDIS 11 to select the master CM of CMs, and steps S58 to S60 of notifying the other CMs (the CM 20 and the CM 22) of the selection of the master CM by the CDIS 11.

Hereinafter, a procedure of selecting the master CM 40 in a centralized topology will be described in detail with reference to FIG. 7.

When the AP 50 is registered to the TVBD 100 and the CM 20 (S51 to S53), the CM 20 is registered to the CDIS 11 (S54). The CDIS 11 acquires information of an available TV channel list from the TVBD 100 (S55). Here, the TVBD 100 updates the available TV channel list at a regular interval. The CDIS 11 calculates C-MAP and a neighbor or neighbor set of CMs (e.g., the CM 20 and the CM 22) (S56) to select the CM 20 as the master CM (S57), and then notifies CMs of the selection of the master CM (S58 to S60). The CM 21 that is finally selected is a master of an AP (S61).

FIG. 8 is a signal flowchart illustrating a method for selecting the master CM in a coexistence system with a distributed topology according to an embodiment of the present invention.

As illustrated in FIG. 8, the method for selecting the master CM by a distributed topology includes a step S75 of receiving channel lists from the TVBD 100 by the CDIS 11, steps S76 to S79 of calculating C-MAP and a neighbor of CMs by the CDIS 11 and notifying CMs of the calculation result, and steps S80 to S82 of performing negotiation between CMs in order to select the master CM or a master device by each of the CMs.

Hereinafter a procedure of selecting the master CM in a distributed topology will be described in detail with reference to FIG. 8.

When the AP 50 is registered to the TVBD 100 and the CM 20 (S71 to S73), the CM 20 is registered to the CDIS 11 (S74). The CDIS 11 acquires information of an available TV channel list from the TVBD 100 (S75). Here, the TVBD 100 updates the available TV channel list at a regular interval. The CDIS 11 calculates-MAP and a neighbor or neighbor set of CMs (S76) and notifies CMs of neighbor lists of the CMs (S77 to S79). The CMs negotiates a resource between the CMs to select a master CM (S80 to S82), and the selected master CM 21 is a master of an AP (S83). The selected master CM 21 notifies the CM of this fact (S84 and S85).

Figure 9:
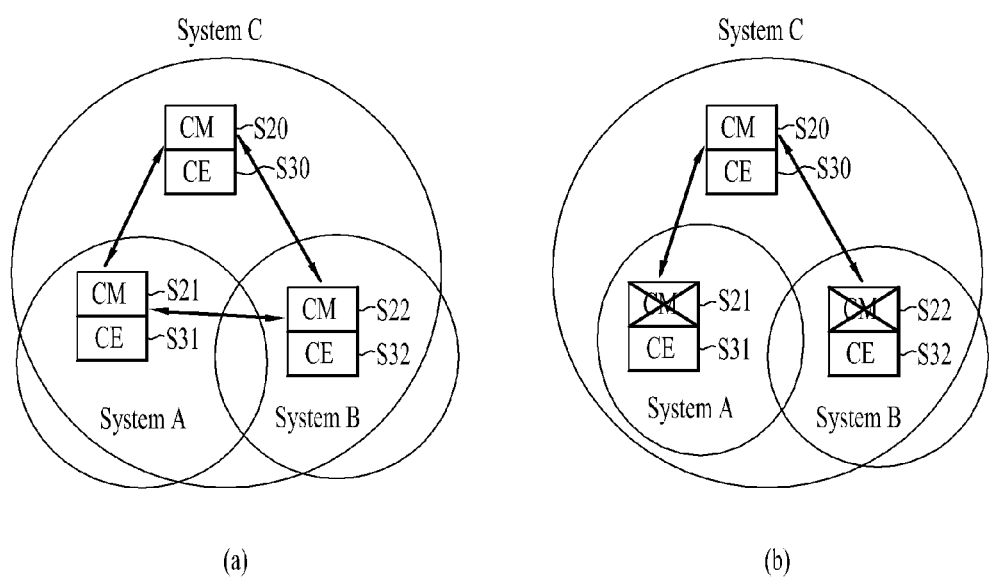
FIG. 9 is a diagram illustrating an example in which various structures can be adaptively supported via enable/disable between heterogeneous CMs in a coexistence system according to an embodiment of the present invention.
Figure 10:
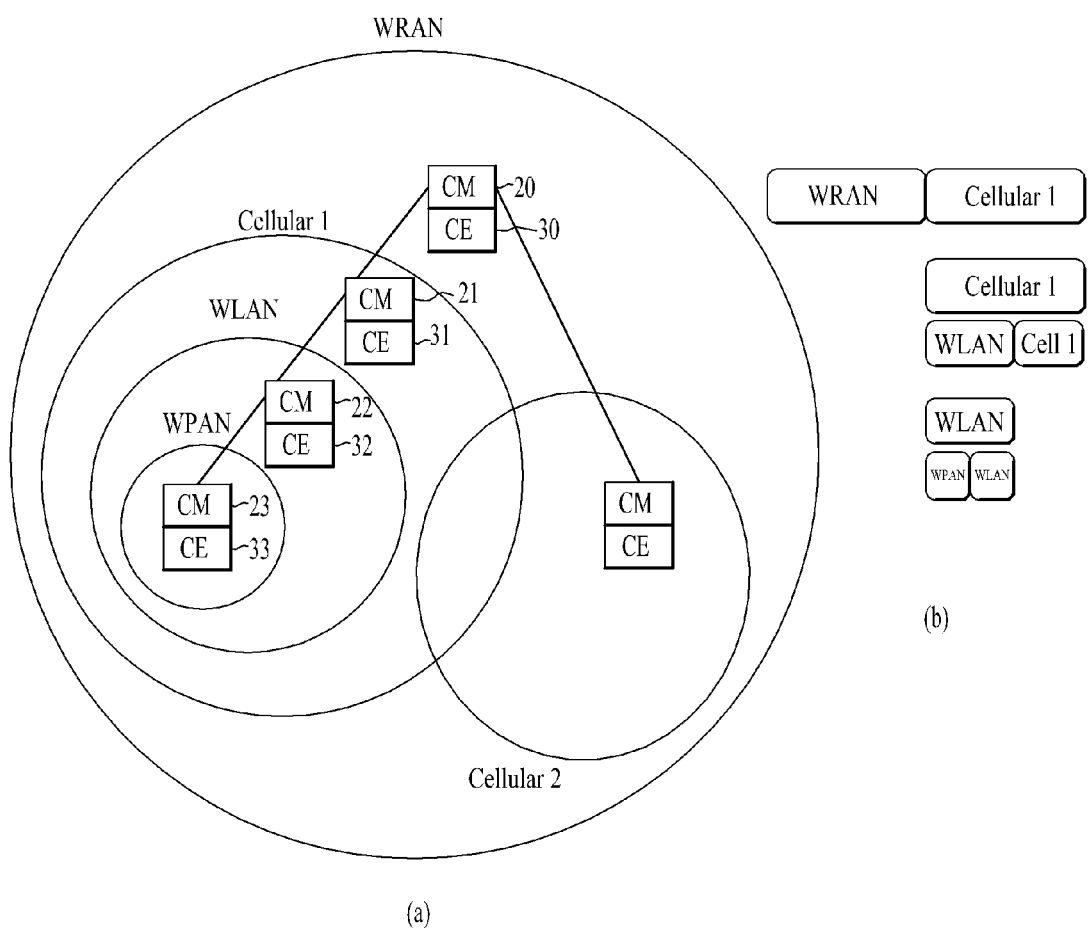
FIG. 10 is a diagram illustrating an example in which a hierarchical structure is formed and operated via enable/disable between heterogeneous CMs in a coexistence system according to an embodiment of the present invention.

As seen from FIGS. 9 and 10, in a network in which homogeneous systems can coexist without cooperation, a master CM or a master device (BS, eNodeB, MS, etc.) is selected, and a network or device (or CM/CE of a device) that is not a mater CM or a mater device is controlled to be ON/OFF or disabled so as to adaptively support various types of structures.

FIG. 9 is a diagram illustrating an example in which various structures can be adaptively supported via enable/disable between heterogeneous CMs in a coexistence system according to an embodiment of the present invention.

As illustrated in FIG. 9, CMs of a heterogeneous system that requires cooperation may adaptively support various types of structures ON/OFF, active/inactive, enable/disable, or the like between the CMs. As illustrated in FIG. 9(a), when a structure between CMs of each heterogeneous system (e.g., a system A, a system B, and a system C) is formed as a peer-to-peer structure, it may be seen that an enabled CM 20 is operated as a controller of the disable CM 21 and CM 22 to form a tree structure via enable/disable, etc. between CMs, as illustrated in FIG. 9(b).

FIG. 10 is a diagram illustrating an example in which a hierarchical structure is formed and operated via enable/disable between heterogeneous CMs in a coexistence system according to an embodiment of the present invention. As seen from FIG. 10(a), a master CM may be selected via ON/OFF, active/inactive, enable/disable, or the like between the heterogeneous CMs to form a vertical relation, and each CM may perform decision making on networks of a horizontal layer and a lower layer of the CM.

For example, as illustrated in FIG. 10(b), a cellular system may determine resource regions of the cellular system and a WLAN as a lower layer of the cellular system, and the WLAN may determine resource regions of the WLAN and a WPAN as a lower layer of the WLAN with respect to resources allocated from the cellular system.

Figure 11:
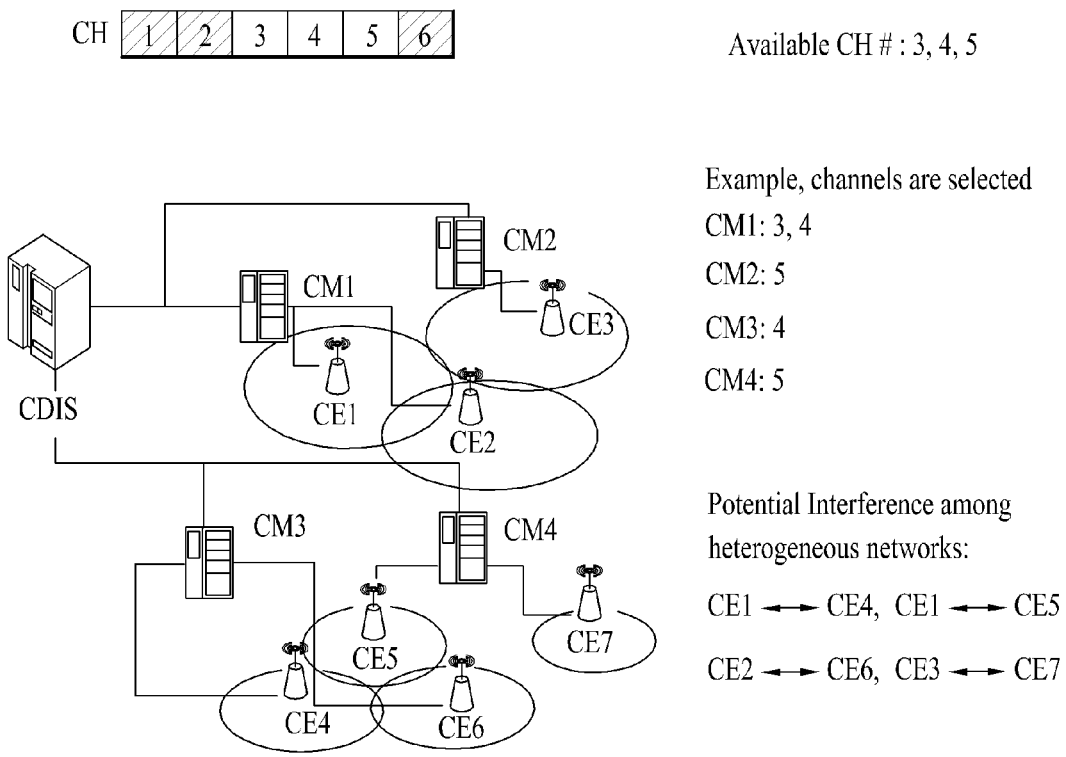
FIG. 11 illustrates interference in a network according to channel selection between CMs.

FIG. 11 illustrates interference in a network according to channel selection between CMs. In FIG. 11, it is assumed that among channels #1 to #6 in a TVWS band, available channels are channels #3, #4, and #5. In addition, in FIG. 11, a circle or oval indicated around each CE denotes coverage of each CE. FIG. 11 corresponds to a case in which a master CM is not selected. Thus, the CMs CM1, CM2, CM3, and CM4 may randomly select the available channel. For example, the CM1 may select channels #3 and #4, the CM2 may select a channel #5, the CM3 may select a channel #4, and the CM4 may select a channel #5. Then, each CM may randomly allocate the available channel to CEs connected or registered to the CM.

Coverage of each CE indicated in FIG. 11 occupies the same space as coverage of another CE in a direction from an upper portion to a lower portion. For example, coverage of a CE1 geographically overlaps with coverage of a CE4 and CE5 below the CE1, coverage of a CE2 geographically overlaps with coverage of a CE6 below the CE2, and coverage of a CE3 geographically overlaps with coverage of a CE7 below the CE3. Accordingly, like in the example of FIG. 11, when the CMs randomly select a channel among the available channels, interference may occur between TVWS bands used by the CEs. Thus, a channel in a TVWS band may be appropriately selected with respect to each CM to prevent this interference. Accordingly, in this end, the present invention proposes a method for select a master CM to perform decision making (including channel selection) for CMs.

Figure 12:
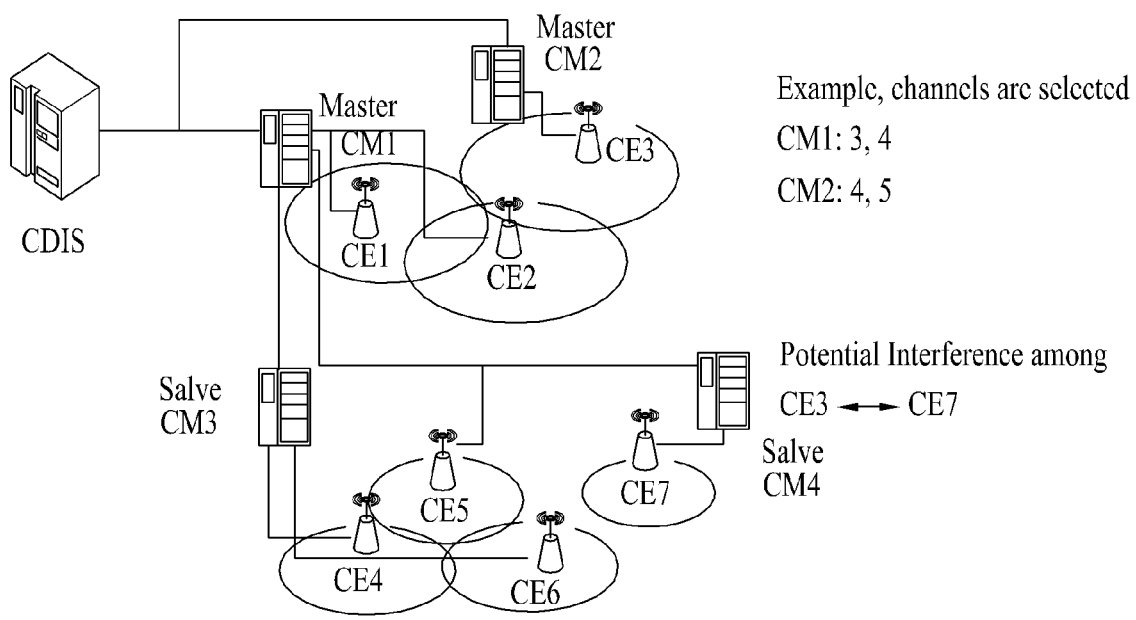
FIG. 12 illustrates interference in a network according to channel selection between CMs after a CM is selected according to an embodiment of the present invention.

FIG. 12 illustrates interference in a network according to channel selection between CMs after a CM is selected according to an embodiment of the present invention. In the embodiment associated with FIG. 12, it is assumed that available channels are channels #3, #4, and #5 among channels #1 to #6 in a TVWS band. The CM1 and the CM2 are selected as a master CM among the CM1 to the CM4 of FIG. 11. In addition, the master CM1 and the master CM2 select channels #3 and #4, and channels #4 and #5, respectively.

Also in the case of FIG. 12, when coverages of two or more CEs belong to different master CMs that select the same channel overlap with each other (e.g., the CE3 and the CE7) may still interfere each other. However, in the case of FIG. 12, it is expected that channel distribution is appropriately performed on CEs connected or registered to the same master CM by one master CM. Thus, the probability of interference between CEs connected to the same master CM may be reduced.

Thus, one CM may be selected as a master CM for coexistence management among a plurality of CMs in a TVBD network for coexistence. The master CM may perform decision making of channel selection for a WSO registered or connected for the remaining CMs (i.e., slave CMs) as well as the master CM. A decision making scheme or topology for coexistence may be of an autonomous type, a distributed type, and a centralized type. In the autonomous scheme or topology, a CM independently performs decision making for coexistence from other CMs. In the distributed scheme or topology, a CM negotiates for decision making with other CMs that serve neighboring WSOs. In the centralized scheme or topology, one CM, that is, a master CM controls decision making for other CMs, that is, slave CMs. A CM may change a decision making topology anytime.

Thus, as described above, based on the advantages and disadvantages of the distributed and centralized topologies, the decision making topology may be changed or switched. For example, when the distributed topology is switched to the centralized topology or a pre-selected master CM cannot function as a master CM any longer while maintaining the centralized topology, a master CM needs to be selected. In the following embodiments of the present invention, a trigger condition of a master CM selection process will now be described.

A request for selection of the master CM may be initiated according to a specific condition. Assuming that the specific condition is not defined and a CDIS or all CMs belonging to the same network can arbitrarily request selection of the master CM, effectiveness for the master CM selection request for management of a coexistence service may be reduced.

One embodiment of the present invention proposes three trigger mechanisms (i.e., trigger conditions) for the master CM selection request. When the trigger condition is satisfied, a CM may request a CDIS to initiate a master CM selection procedure or process, that is, reconfiguration of a coexistence topology. Alternatively, when the trigger condition is satisfied, one CM may request another CM to initiate a master CM selection procedure or process, that is, reconfiguration of a coexistence topology. That is, as the trigger condition is satisfied, the master CM selection procedure may be triggered.

A first trigger condition may use an interference level. In more detail, the first trigger condition may use (1) an interference level that affects TVBD networks or devices that are connected or registered to each CM or (2) a proportion of the number of devices or TVBD networks that are connected or registered to each CM. In more detail, in the case (2), CMs exchange information about the number of devices or networks connected or registered to the respective CMs with a neighboring CM, and when the number of the devices connected or registered to the corresponding CM is smaller than the neighboring CM, the corresponding CM may trigger a master CM process. On the other hand, when the number of the devices connected or registered to the corresponding CM is greater than the neighboring CM, the corresponding CM may trigger a master CM process in order to determine the corresponding CM as a master CM.

In the case (1), an average noise power indicator (ANPI) indicating the interference level may be used. The ANPI corresponds to the sum of noise power and average noise power measured for a predetermined measurement period when a channel is idle. Accordingly, an interference parameter in the case (1) may be represented according to Equation 1 below.

$$A\_ANPI = Avg\{ANPI(\text{registered TVBD networks or devices})\} \quad \text{Equation 1}$$

Here, the term "registered TVBD networks or devices" refers to networks or devices connected or registered to one CM.

In the case (2), an interference parameter INF_RATIO indicating the interference level may be represented according to Equation 2 below.

$$INF_{RATIO} = \frac{\text{a number of } TVBD \text{ networks or devices of a neighboring } CM}{\text{a number of registered } TVBD \text{ networks or devices of a } CM} \quad \text{Equation 2}$$

When A_ANPI exceeds a first threshold or INF_RATIO is equal to or less than a second threshold, a CM may request the CDIS or a neighboring CM to select a master CM, and the first and second thresholds may be changed in some embodiments of the present invention. In detail, when A_ANPI is equal to or less than a third threshold or INF_RATIO exceeds a fourth threshold, the corresponding CM may consider that corresponding interference is low or load of a neighboring CM except for the corresponding CM is high and indicate that the CM is a master CM to the CDIS or a neighboring CM. Alternatively, the CM may trigger a master CM selection process.

A second trigger condition may be based on load balancing in order to balance computational overhead for each CM and to limit the computational overhead for each CM within a threshold.

For the load balancing, a load balancing parameter for each CM may be defined. For example, the load balancing parameter may be based on the number of devices or networks connected or registered to each CM. In addition, for example, the load balancing parameter may be based on the number of available channels of each CM.

In more detail, Load($CM_i$) indicating load of $CM_i$, corresponding to the number of devices or TVBD networks connected or registered to $CM_i$, may be defined. In addition, NumAvailChannel($CM_i$) corresponding to the number of available channels with respect to $CM_i$ may be defined.

For example, when Equation 3 is satisfied, $CM_i$ may request the CDIS to initiate a master CM selection procedure or process.

$$\text{Load}(CMi) \geq \text{Trigger\_Threshold} * \text{NumAvailChannel}(CMi) \quad \text{Equation 3}$$

Here, Trigger_Threshold is a variable value in some embodiments of the present invention. That is, when the number of TVBD networks or devices connected or registered to $CM_i$ is equal to or greater than a threshold, the corresponding $CM_i$ may request master CM selection to relieve load exerted to the corresponding $CM_i$. In detail, when Load($CM_i$) is less than a fifth threshold, the corresponding $CM_i$ may a procedure so as to select the corresponding $CM_i$ as a master CM.

For example, a method for triggering a master CM selection request process to select a master CM by a CDIS or a CM that receives a request will now be described.

Step 1: Frac($CM_i$) corresponding to a load balancing with respect to each CM is calculated. Frac($CM_i$) may correspond to Load($CM_i$)/NumAvailChannel($CM_i$). However, a CM that requests the master CM selection may be excluded among CMs and a candidate master CM that previously rejects CDIS_MasterCM_Request corresponding to a message for requesting acceptance of a master CM by a CDIS may be excluded. In detail, when Load ($CM_i$) of a current CM is less than a fifth threshold and thus the current CM intends to be a master CM, a CM that makes a request in a master CM selection procedure is included. In more detail, in this case, the current CM may be determined as a master CM without a separate selection procedure. Then, the CDIS may acquire a minimum value Min{Frac($CM_i$)} of Frac ($CM_i$).

Step 2: Whether Min{Frac(CMi)} is less than a threshold (Trigger_Threshold) is determined.

When Min{Frac(CMi)} is less than the threshold, $CM_i$ having Min{Frac($CM_i$)} is set as a candidate master CM and CDIS_MasterCM_Request may be transmitted to the candidate master CM.

When Min{Frac(CMi)} is less than the threshold, the method proceeds to the following step 3.

Step 3: $CM_k$ having Min{Frac($CM_i$)} is set as a candidate master CM. Then, Load($CM_k$)=Load($CM_k$)+Load($CM_r$) is set and $CM_r$ corresponds to a CM that requests the master CM selection. In addition, a new CM set S(CM) is defined. S(CM) is a list formed by aligning CMs calculated in Step 1 and is a list formed by aligning Frac($CM_i$) corresponding to a load balancing ratio with respect to each CM in descending order.

With respect to all $CM_j$ in S(CM), a new load balancing ratio Frac(CMk) for $CM_k$ is calculated. Frac($CM_k$) may be determined according to Equation 4 below.

$$\text{Frac}(CMk)=\{\text{Load}(CMk)+\text{Load}(CMj)\}/\text{NumberAvailChannel}(CMk+CMj) \quad \text{Equation 4}$$

Then, when Frac($CM_k$) is the threshold Trigger_Threshold are compared and Frac($CM_k$) is less than the threshold Trigger_Threshold with respect to all CMjs, the all CMjs are set as slave CMs of $CM_k$ and the CDIS transmits CDIS_MasterCM_Request to $CM_k$. When $CM_k$ accepts CDIS_MasterCM_Request, MasterSlaveCMConfiguration_Announcement containing information about CDIS_MasterCM_Request to the slave CMs.

A third trigger condition may be based on geological coverage of a CM. The CDIS may periodically calculate geographic coverage with respect to each CM and may determine whether geographic coverage of one CM overlaps or cover geographic coverage of another CM. That is, when geographic coverage of $CM_i$ overlaps or covers geographic coverage of $CM_j$, $CM_j$ may be set as a master CM and $CM_i$ may be set as a slave CM.

Figure 13:
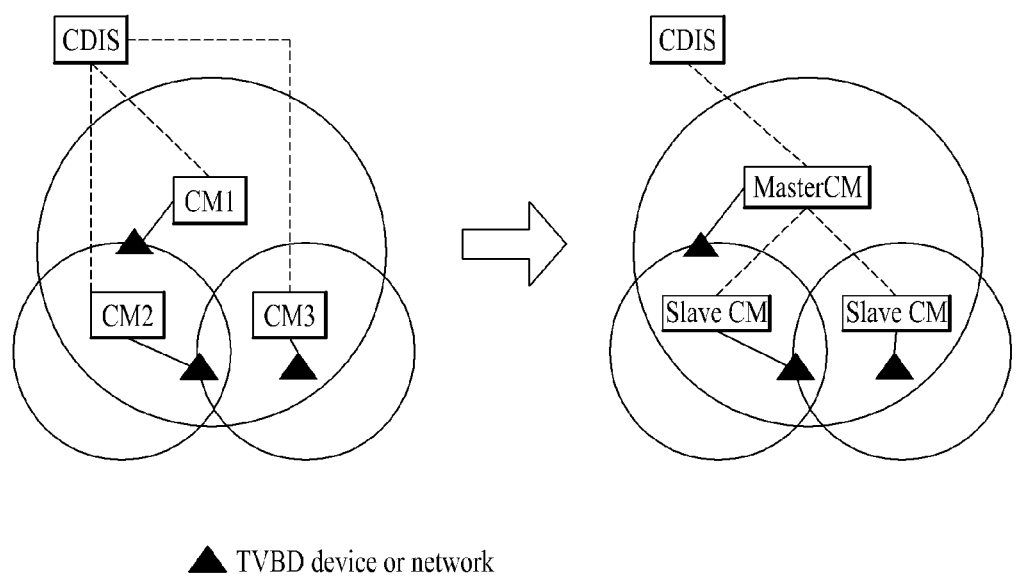
FIG. 13 illustrates an example of master/slave CM selection by a CDIS.

FIG. 13 illustrates an example of master CM selection according to the third trigger condition. A left portion of FIG. 13 illustrates geographic coverage of each CM before a master CM is set. It may be seen that, according to the master CM selection method according to the third trigger condition, a CM1 having t the widest geographic coverage is selected as a master CM and the remaining CM2 and CM3 are set as slave CMs. As seen from FIG. 13, even if geographic coverage of the CM1 does not completely cover geographic coverage of other CMs, that is, even if the geographic coverage of the CM1 overlaps the geographic coverage of other CMs, the CM1 may be selected as a master CM. FIG. 13 is purely exemplary and thus does not limit the scope of the present invention. A unit of coverage of each network or device may be determined as geographic coverage of the CM using location information of TVBD networks or devices connected or registered to each CM and coverage of each network or device. That is, the unit may be determined as GeoCoverage (CMi)=U {x, y, r} for all registered TVBD networks or devices. Here, x, y, and r refer to each location and coverage r.

The trigger condition may be analyzed or determined by a CM or a CDIS. As described above, the trigger condition may be analyzed or determined by one of the CM or the CDIS. However, at least one of the CM or the CDIS may analyze or determine the trigger condition.

The method according to the present invention that has been described thus far may be embodied in the form of software, hardware, or a combination thereof. For example, the method according to the present invention may be stored in a storage medium (e.g., a mobile terminal internal memory, a flash memory, a hard disk, etc.) and may be embodied in the form of codes or commands in a software program that can be executed by a processor (e.g., a mobile terminal internal micro processor).

A UE or apparatus according to embodiments of the present invention as an example of hardware may be interpreted as including a mobile terminal (e.g., a UE, a mobile equipment (ME), a user terminal (UT), a subscriber station (SS), a mobile subscriber station (MSS), a wireless device, a handheld device, and an access terminal (AT)), a digital television (TV), a global positioning system (GPS) navigation player, a portable gaming player, an MP3 player, other home appliances, etc. by which the aforementioned embodiments are embodied.

Thus far, an apparatus and method according to at least one of the disclosed embodiments of the present invention has been described with reference to the exemplified drawings. However, it will be apparent to those skilled in the art that the present invention is not limited by the disclosed embodiments of the present invention and the drawings and various modifications may be formed by those skilled in the art within the scope of the technical spirit of the present invention.

Configurations and methods according to the aforementioned embodiments are not limited to the aforementioned method for selecting a master device in a coexistence system. The aforementioned embodiments may be entirely or partially combined and configured to form various modifications.

Terms or words used herein shall not be limited to having common or dictionary meanings, and have the meanings corresponding to technical aspects of the embodiments of the present invention so as to most suitably express the embodiments of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Embodiments of the present invention are applicable to various apparatuses or terminals in a wireless communication system.

The invention claimed is:

1. A method for requesting selection of a master management apparatus by a management apparatus for coexistence of television white space (TVWS) devices in a television white space (TVWS), the method comprising:
determining whether a trigger condition of a process for selection of the master management apparatus is satisfied; and
requesting another management apparatus to select the master management apparatus when the trigger condition is satisfied,
wherein the master management apparatus is configured to:
perform determination associated with channel selection in the TVWS for the TVWS devices connected to slave management apparatuses and the master management apparatus; and
control decision making for the slave management apparatuses; and
wherein the trigger condition is based on a load balancing parameter of the management apparatus, and
wherein the determining comprises comparing the load balancing parameter and a reference value to determine whether the trigger condition is satisfied.

2. The method according to claim 1, wherein the determining comprises determining whether geographic coverage of the management apparatus based on a geographic coverage parameter is included in or overlaps geographic coverage of another management apparatus based on a geographic coverage parameter of the another management apparatus.

3. The method according to claim 1, wherein the load balancing parameter is dependent upon the number of networks or TVWS devices connected to the management apparatus.

4. The method according to claim 1, wherein the load balancing parameter is dependent upon the number of channels available for the management apparatus.

5. The method according to claim 1, wherein:
the trigger condition is further based on an interference parameter of the management apparatus; and
the interference parameter comprises at least one of a first interference parameter and a second interference parameter.

6. The method according to claim 5, wherein:
the first interference parameter is an average noise power indicator (ANPI); and
the ANPI indicates the sum of an interference power value and an average noise power value measured for a predetermined period of time with respect to a channel used by the management apparatus.

7. The method according to claim 5, wherein the second interference parameter is a ratio of the number of networks or TVWS devices registered to a neighboring management apparatus to the number of TVWS devices or networks registered to the management apparatus.

8. A management apparatus for coexistence of television white space (TVWS) devices in a television white space (TVWS), the management apparatus comprising:
a transceiver; and
a controller configured to:
control the transceiver;
perform a determination associated with the coexistence;
determine whether a trigger condition of a process for selection of a master management apparatus is satisfied; and
request, through the transceiver, another management apparatus to select the master management apparatus when the trigger condition is satisfied,
wherein the master management apparatus is configured to:
perform determination associated with channel selection in the TVWS for the TVWS devices connected to slave management apparatuses and the master management apparatus, and
control decision making for the slave management apparatuses, and
wherein the process is triggered based on a load balancing parameter of the management apparatus, and
wherein the controller is further configured to compare the load balancing parameter and a reference value to determine whether the trigger condition is satisfied.

9. The management apparatus according to claim 8, wherein the controller is further configured to determine whether geographic coverage of the management apparatus based on a geographic coverage parameter is included in or overlaps geographic coverage of another management apparatus based on a geographic coverage parameter of the another management apparatus to determine whether the trigger condition is satisfied.

10. The management apparatus according to claim 8, wherein the load balancing parameter is dependent upon the number of networks or TVWS devices connected to the management apparatus.

11. The management apparatus according to claim 8, wherein the load balancing parameter is dependent upon the number of channels available for the management apparatus.

12. The management apparatus according to claim 8, wherein:
the trigger condition is further based on an interference parameter of the management apparatus; and
the interference parameter comprises at least one of a first interference parameter and a second interference parameter.

13. The management apparatus according to claim 12, wherein:
the first interference parameter is an average noise power indicator (ANPI); and
the ANPI indicates the sum of an interference power value and an average noise power value measured for a predetermined period of time with respect to a channel used by the management apparatus.

14. The management apparatus according to claim 12, wherein the second interference parameter is a ratio of the number of networks or TVWS devices registered to a neighboring management apparatus to the number of TVWS devices or networks registered to the management apparatus.

* * * * *